Figure 1:
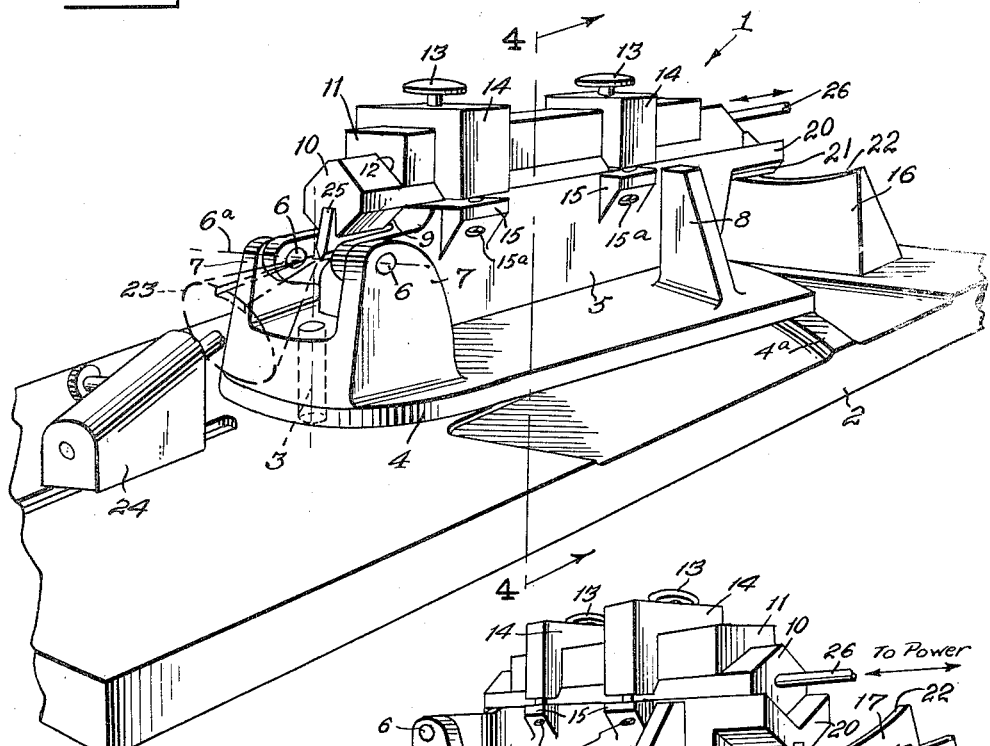

Dec. 1, 1959

C. E. PELANDER 2,914,993

TOOL SHAPING MACHINE

Filed March 4, 1958

3 Sheets-Sheet 1

INVENTOR.
Carl E. Pelander
BY
W. E. Thibodeau & S. J. Rotondi

Dec. 1, 1959  C. E. PELANDER  2,914,993
TOOL SHAPING MACHINE
Filed March 4, 1958  3 Sheets-Sheet 2
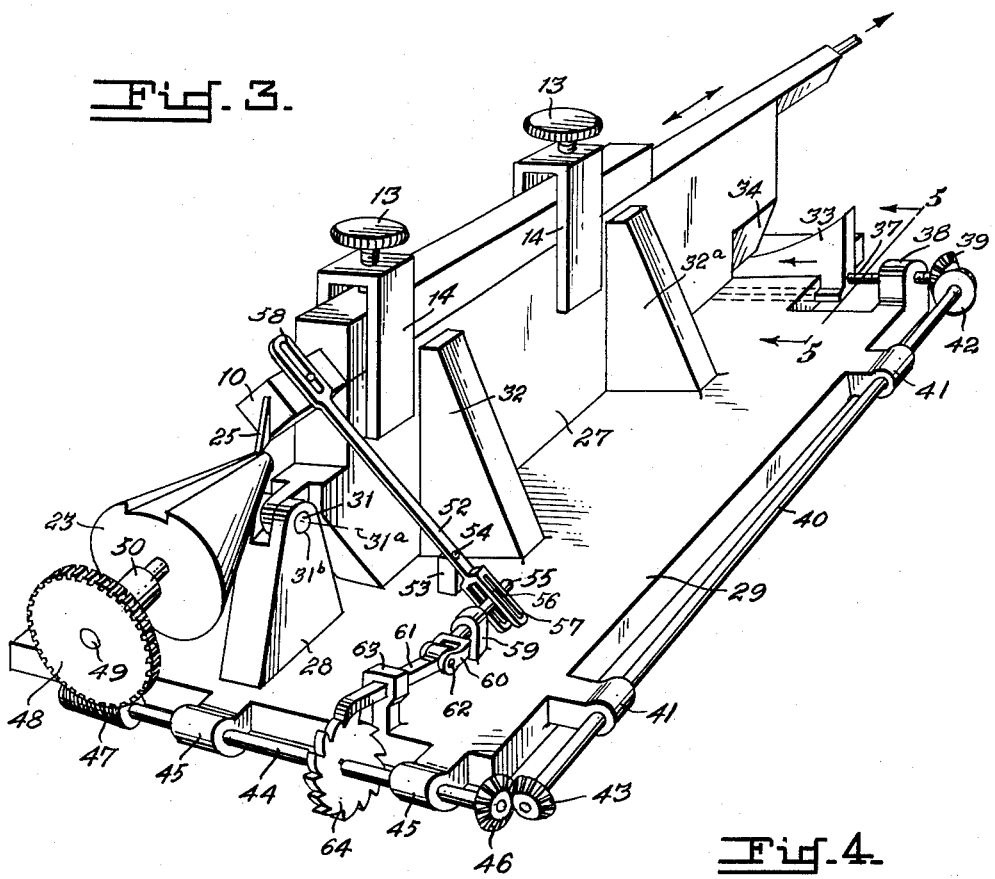
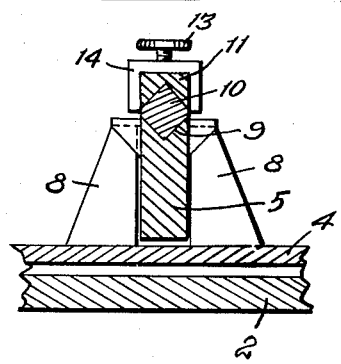
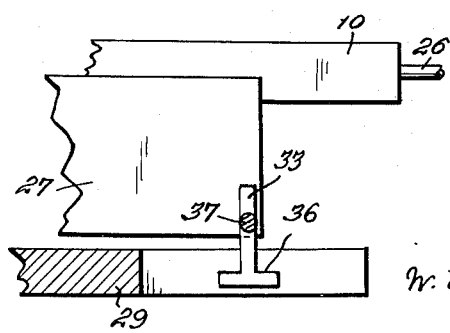
INVENTOR.
Carl E. Pelander
BY
W. E. Thibodeau & S. J. Rotondi, Jr.

Dec. 1, 1959 C. E. PELANDER 2,914,993
TOOL SHAPING MACHINE
Filed March 4, 1958 3 Sheets-Sheet 3

INVENTOR.
Carl E. Pelander
BY
W. E. Thibodeau & S. J. Rotondi Jr.

United States Patent Office 2,914,993
Patented Dec. 1, 1959

2,914,993
TOOL SHAPING MACHINE
Carl E. Pelander, McLean, Va., assignor to the United States of America as represented by the Secretary of the Army Application March 4, 1958, Serial No. 719,175
2 Claims. (Cl. 90—24.3)
(Granted under Title 35, U.S. Code (1952), sec. 266)

The invention described herein may be manufactured and used by or for the Government for governmental purposes without the payment to me of any royalty thereon.

This invention relates to a shaping machine and more particularly to a machine for cutting contours that require a geometry having an axis and lines projecting from about it to a common point on it.

The method used at present incorporates the use of a three-dimensional pantograph with a master template governing the contour to be machined. The cutter rotates in a spindle, milling the contour into the material. This method has several disadvantages, such as the length of time involved in cutting the desired contour, unsatisfactory surface, difficulty in maintaining a good cutting edge during the machining of certain materials and the inability to machine other than straight or in one plane to the axis of the cone.

With the present invention, the cuts may be made straight from the apex to an outer periphery, helical, and irregular. The apparatus conceived to practice the invention comprises a master template to determine the radial contour of the cross section machined surface. A cam can be incorporated to give direction to the cut other than straight from the axis and the shape of the cam determines whether the cut will be straight, helical or irregular to the axis contour to be cut. Among the advantages this machine has over the existing machines are faster operation, a finer surface finish and universality in use of accessories.

It is therefore a primary object of this invention to provide a shaping machine for cutting contours into blocks and or radially about the surface of a conical shaped piece of material.

Another object of the invention is to provide a shaping machine for shaping a contour on a conical workpiece, with the deepest and greatest breadth of cut provided at the greatest diameter of the cone and diminishing proportionally to infinity at the apex, such as might be found in tools such as pipe reamers.

A further object of the invention is to provide a shaping machine to cut other than straight or in one plane to the axis of the stationary template.

It is a still further object of the invention to provide a shaping machine for shaping a contour that will be swift in operation, provide a smooth surface and achieve more flexibility with the use of accessories.

Figure 2:
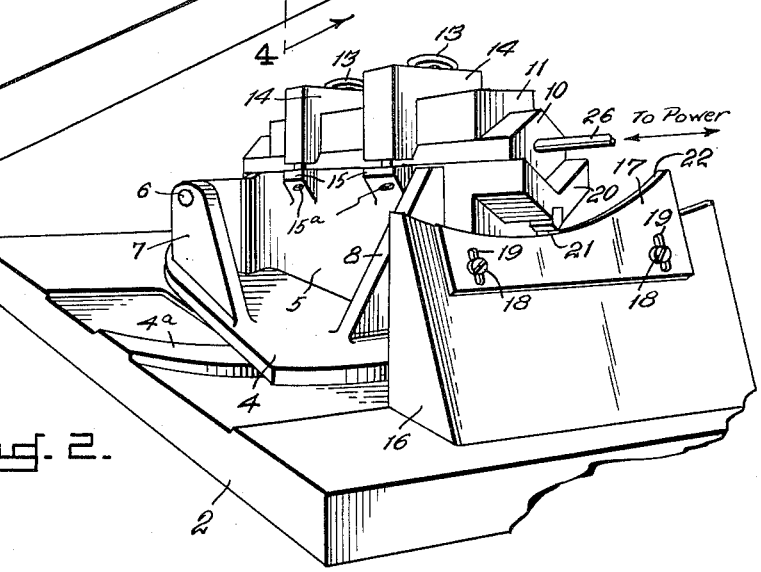
Figure 6:
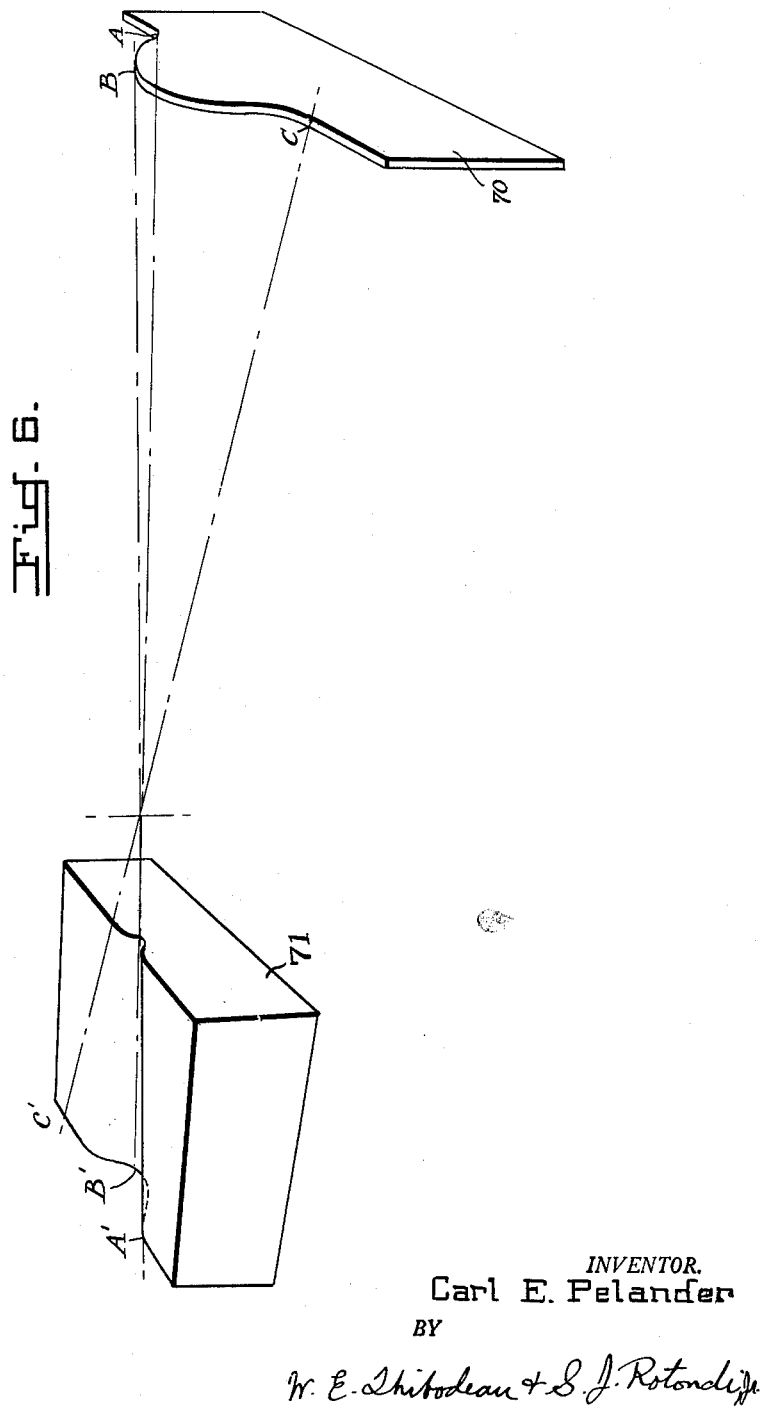

The specific nature of the invention as well as other objects and advantages thereof, will clearly appear from a description of a preferred embodiment as shown in the accompanying drawings in which:

Figure 1 is a perspective view of a shaping machine constructed in accordance with the invention, Figure 2 is a perspective view of the machine taken from the rear, Figure 3 is a perspective view of a modified form of a shaping machine, Figure 4 is a cross-sectional view taken along lines 4—4 of Figure 1 and looking in the direction of the arrows, and Figure 5 is a cross sectional view taken along line 5—5 of Figure 3, and looking in the direction of the arrows, Figure 6 is a schematic perspective view illustrating another modified form of a work piece and template.

Referring more particularly to the drawing, wherein like reference characters designate like or corresponding parts throughout the different views, 1 indicates generally the shaping device of the invention, having a base 2. Pivotally mounted about a vertical axis at 3 is a horizontally angularly swinging plate or base 4 the bottom of which rides on a raised bearing surface 4a, integral with plate 4, to reduce friction. A ram mount 5 is hinged at one end by pins 6 to a pair of upright ears or standards 7 integral with the base 2, to enable mount 5 to pivot about a horizontal axis 6a intersecting and perpendicular to vertical axis 3. A pair of laterally spaced upright guide members 8 integral with plate 4 and located adjacent the unhinged end thereof, provide a vertical guideway for ram mount 5 as it pivots about axis 6a. The upper surface of mount is mortised to form a V-shaped slideway 9 to receive a reciprocable ram 10. An elongated ram retaining member 11 disposed immediately above ram mount 5 has its lower surface 12 cut to form an inverted V-shaped slideway, cooperating with slideway 9 to guide the ram 10. The retaining member 11 may be adjusted for proper movement of the ram 10 by a pair of thumbscrews 13, threadably received in vertical bores formed in spaced apart inverted U-shaped brackets 14 integral with ram retaining member 11 and having downwardly depending legs in vertical alinement with lugs 15 extending laterally from side walls of ram mount 5. Screws 15a extending through vertical holes in lugs 15 and the vertical legs of bracket 14 prevent vertical displacement of the ram assembly after adjusting screws 13 have set the assembly in preset position.

An upright boss 16 integral with the base 2 and disposed to the rear of ram mount 5 provides a mount for attaching a template or cam 17. The template 17 is secured for vertical adjustment to boss 16 by bolts 18 extending through elongated slots 19 in the template. An extension or tongue 20 integral with the ram mount 5 extends rearwardly over the template and is provided with a bearing surface 21 at its lower side to bear upon the upper surface 22 of template 17. Power for motivating the pivoted base 5 or for reciprocating the ram 10 may be provided in any known or conventional manner not material to the invention as by a manual or mechanical source (not shown). The cam or template 17 is an inverted, reverted image of the contour to be cut in the cone surface. The magnification of this unit is governed by the slant height of the cone to the distance from the pivot axis 3 to the cam or template on the ram base.

The work piece 23 is adjustably mounted to base 2 as at 24 and is disposed forwardly of the plate 4. The forward end of the ram is adapted to hold a tool bit 25, thus completing the assembly, 26 denoting a part of linkage, etc. for attaching a source of power to operate the ram and cutter. For optimum operation, the apex of the work piece should be superimposed upon the intersection of pivot axes 3 and 6a. So also should the point of the tool superimpose with this position during its movement.

The operation of the machine is as follows:

The work piece 23 is suitably mounted for machining in front of the machine as is best seen in Figure 1. The ram 10 carrying the cutting tool 25 is given a reciprocating motion from a source not shown, and is coupled to said source by a member 26. Template 17 is fastened to the mount 16 and adjusted by bolts 18 in slots 19 until the proper position is attained for making the desired cut in the workpiece. Upon angular motion of the ram mount 5 about the pivot 3, the mount will be moved in a vertical plane due to the bearing member 21 riding upon the upper surface 22 of the template. This angular movement may be accomplished by manual or mechanical means not shown, and not important to an understanding of the invention. The ram mount 5 will be guided through the vertical movement by the upright guides 8 rising from the plate 4. The pattern of the template will govern the pattern of the cross section of the machined surface transverse to the axis such as straight, helical or irregular to the axis of the cone. If it is desired to cut a helix on a conical form, the workpiece may be rotated by suitable means, not shown. If the axis of the work piece must be other than straight, the workpiece can be moved transversely to the normal axis in proper coincidence with the stroke of the machine.

A modified form of the invention is illustrated in Figure 3. In this form, the ram mount 27 is limited to vertical movement only, and the template is fed in a direction transverse to the axis of the ram. The ram mount 27 is pivotable about a horizontal axis 31a defined by a pin 31 received in transversely alined bores 31b in the bifurcated upper end of a standard 28 integral with the forward portion of base 29. Longitudinally spaced upright members 32, 32a are formed integral with the base 29 and arranged in pairs spaced apart transversely (only one of each pair shown) for vertical movement of ram mount 27 as it pivots about axis 31a. A template or cam 33 is mounted for transverse movement relative to the longitudinal axis of the ram mount 27 to actuate the ram mount vertically, by having its upper surface bear against the under side of a wedge-shaped portion 34 integral with the rear end of the mount 27. Figure 5 illustrates one method of providing a slideway for the template 33, wherein the template 33 is seen as an inverted T-shaped groove 36 formed in base 29. Means for feeding the template under the ram mount 27 include a screw-threaded shaft 37 threadably received in a boss 38 integral to base 29. Shaft 37 is provided with a beveled gear 39 at one of its ends and is connected to the template 33 at its other end. An elongated shaft 40 is disposed in parallel relation to the base 29 and is journaled for free rotation in a pair of spaced bosses 41 extending laterally from the base 29, and is provided with a beveled gear 42 at one end thereof meshing with gear 39, and another bevel gear 43 mounted at the other end thereof. A similarly mounted shaft 44 is disposed at right angles to shaft 40 in a pair of spaced, laterally extending bosses 45 and is provided at one end thereof with a beveled gear 46 which meshes with gear 43 and at the other end thereof with a worm 47 adapted to mesh with a worm gear 48 mounted on a spindle shaft 49 journaled in an upright bearing 50. The work piece 23 is mounted at the other end of the shaft 49 and is held under the cutter 25. Pivoted to the forward portion of ram 10 is an arm 52 pivoted to a suitable support 53 integral to base 29 by a pin 54. This arm is forked at one end thereof for pivotal attachment to a reciprocating shaft 55 by a pin 56. Both formed ends of the arm 52 in which pins 51 and 56 are connected are slotted as at 57 and 58 in order to provide suitable play of the linkage assembly.

The shaft 55 slides in a boss 59 integral to base 29 and is provided with a fork 60 for pivotal connection of one end of a pawl 61 by pin 62. Pawl 61 is slidably mounted in bearing member 63 integral to base 29. The other end of pawl 61 cooperates with a ratchet wheel 64 mounted on shaft 44 and completes the assembly.

In Figure 6 there is shown another modified form of work piece and template. The template 70 in this case is reversely curved. The projection lines A—A¹, B—B¹ and C—C¹ illustrate the resulting cut on the workpiece 71.

The operation is as follows:

As the ram 10 carrying the cutting tool 25 reciprocates forwardly in its slideways, arm 52 will be rotated and though the linkage will move pawl 61 rearwardly upon rearward movement of ram 10, the pawl in its rearward movement will cause ratchet wheel 64 to rotate counterclockwise and through the several gears will transmit motion to shaft 37, causing the template to move under the surface 34, providing vertical movement to ram mount 27. The shaft 44 having worm 47 mounted thereto will rotate worm gear 48 which will rotate shaft 49 to give rotation to workpiece 23. As the cut progresses along the face of conical workpiece the cut will be made on a helix to the axis.

The degree of the helix or any irregular angular direction from the axis of the cone may be obtained through a cam that would actuate the rotation of the conical workpiece the same amount through every stroke of the ram. As the ram returns to start a new cut the conical workpiece may be returned to its starting point by any suitable means, not shown.

In both forms, the deepest and greatest breadths of cut is at the greatest diameter of the conical workpiece and diminishes proportionately to infinity at the apex.

The cam or template in either instance is an inverted, reverted image of the contour to be cut. The magnification of this unit is governed by the length of the workpiece to the distance from the pivot to the cam or template on the ram base. For proper operation, the conical workpiece the apex should be superimposed upon the intersection of the pivot axes, so also should the point of the tool.

It is apparent that a shaping machine has been devised that is more efficient than the existing machines and is faster in operation, providing a finer surface finish to the cut and is simple in operation.

While a preferred form of the invention has been shown and described, various modifications and substitutions of equivalents will occur to those skilled in the art after a study of the foregoing disclosure. Hence the disclosure should be taken in an illustrative rather than a limiting sense; and it is the desire and intention to reserve all modifications within the scope of the subjoined claims.

I claim:

1. In a shaping machine, a base, a plate pivotally mounted to said base and adapted for parallel pivotal movement thereto, ram mount pivoting means carried by said plate, an elongated ram face member pivoted at its forward end thereof to said pivoting means, adapted to move in a vertical plane, an upright guideway for said ram mount integral with said plate, a ram member provided with a cutting tool at its forward end, an elongated ram retaining member for said ram, means for adjustably holding said ram member in position carried by said ram mount member, said ram retaining member and said ram mount member having longitudinal grooves mortised in their lower and upper faces respectively to provide slideways for said ram member, a work holding device adjustably mounted upon said base and adapted to hold a workpiece in machining relation to said tool cutter on said ram, a transversely disposed template mounting boss integral to the rearward portion of said base, a template controlling the vertical movement of said ram mount assembly adjustably attached to said boss and its upper surface and adapted to bear against a wedge-shaped bearing surface formed in the lower rearward face of said ram mount member.

2. In a shaping machine, including a base, a plate pivoted to said base and adapted for parallel pivotal movement thereto, an elongated ram mount member hinged at one end thereof to said plate, adapted for vertical movement thereto, vertical alignment means for said ram mount member carried by said plate, an elongated ram member, provided with a cutting tool at its forward end, mounted for reciprocating movement upon the upper surface of said ram mount member, adjustable retaining means for said ram member carried by said ram mount, adjustable means for imparting vertical movement to said ram mount, transversely and rearwardly disposed upon said base, and a mandrel adjustably mounted upon said base and disposed forwardly thereon, said mandrel adapted to hold a workpiece in longitudinal alignment to said ram member and in cutting relation thereto.

No references cited.